US011724549B2

(12) United States Patent
Hamanaka

(10) Patent No.: US 11,724,549 B2
(45) Date of Patent: Aug. 15, 2023

(54) PNEUMATIC TIRE

(71) Applicant: The Yokohama Rubber Co., LTD., Tokyo (JP)

(72) Inventor: Hideki Hamanaka, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 401 days.

(21) Appl. No.: 16/962,807

(22) PCT Filed: Nov. 30, 2018

(86) PCT No.: PCT/JP2018/044157
§ 371 (c)(1),
(2) Date: Jul. 16, 2020

(87) PCT Pub. No.: WO2019/142508
PCT Pub. Date: Jul. 25, 2019

(65) Prior Publication Data
US 2021/0362551 A1 Nov. 25, 2021

(30) Foreign Application Priority Data
Jan. 18, 2018 (JP) .................................. 2018-006612

(51) Int. Cl.
*B60C 11/11* (2006.01)
*B60C 11/12* (2006.01)
(Continued)

(52) U.S. Cl.
CPC ............... *B60C 11/12* (2013.01); *B60C 11/11* (2013.01); *B60C 11/13* (2013.01);
(Continued)

(58) Field of Classification Search
CPC . B60C 11/11; B60C 11/1384; B60C 11/1369; B60C 2011/0353;
(Continued)

(56) References Cited

U.S. PATENT DOCUMENTS 4,122,879 A * 10/1978 Takigawa ................ B60C 11/00
D12/594
5,088,535 A * 2/1992 Potts ....................... B60C 11/11
152/209.15

(Continued)

FOREIGN PATENT DOCUMENTS

CN 103826874 5/2014
CN 104129236 11/2014

(Continued)

OTHER PUBLICATIONS

Machine translation for Europe 75760 (Year: 2022).*
International Search Report for International Application No. PCT/JP2018/044157 dated Feb. 19, 2019, 4 pages, Japan.

*Primary Examiner* — Steven D Maki
(74) *Attorney, Agent, or Firm* — Thorpe North & Western

(57) ABSTRACT

A pneumatic tire includes two circumferential main grooves disposed in an inner half of a tread developed width in a tire lateral direction; shoulder lug grooves that divide shoulder land portions into shoulder block portions and that each include a see-through portion in the tire lateral direction; center lug grooves dividing a center land portion into a plurality of center block portions; and center sipes having both ends terminated in the center block portions. The center sipe includes at least two sipe portions having different angles via at least one bent portion. An angle $\theta_1$ of at least one sipe portion with respect to a tire equator line satisfies $0° \leq \theta_1 \leq 15°$, and an angle $\theta_2$ of at least the other sipe portion with respect to the tire equator line satisfies $35° \leq \theta_2 \leq 60°$.

16 Claims, 11 Drawing Sheets

(51) Int. Cl.
*B60C 11/13* (2006.01)
*B60C 11/03* (2006.01)

(52) U.S. Cl.
CPC ...... *B60C 11/1369* (2013.01); *B60C 11/1384* (2013.01); *B60C 2011/0346* (2013.01); *B60C 2011/0348* (2013.01); *B60C 2011/0353* (2013.01); *B60C 2011/0365* (2013.01); *B60C 2011/0369* (2013.01); *B60C 2011/1254* (2013.01)

(58) Field of Classification Search
CPC ..... B60C 2011/0369; B60C 2011/0346; B60C 2011/0365; B60C 2011/0348; B60C 2011/1254
See application file for complete search history.

(56) References Cited

U.S. PATENT DOCUMENTS

| | | | |
|---|---|---|---|
| 5,088,536 A * | 2/1992 | Graas | B60C 11/1369 152/902 |
| 6,220,321 B1 * | 4/2001 | Yoshioka | B60C 11/1369 152/209.27 |
| D860,924 S * | 9/2019 | Hamanaka | D12/579 |
| D862,377 S * | 10/2019 | Hamanaka | D12/604 |
| D868,683 S * | 12/2019 | Hamanaka | D12/596 |
| 10,787,038 B2 | 9/2020 | Fujioka | |
| 2005/0103416 A1 * | 5/2005 | Rooney | B60C 11/0316 152/209.19 |
| 2007/0199633 A1 | 8/2007 | Hayashi | |
| 2008/0078488 A1 | 4/2008 | Yoda | |
| 2012/0241061 A1 * | 9/2012 | Maehara | B60C 11/0306 152/209.22 |
| 2014/0326381 A1 | 11/2014 | Hamanaka | |
| 2016/0361953 A1 | 12/2016 | Fujioka | |
| 2018/0001708 A1 | 1/2018 | Fujioka | |
| 2019/0111737 A1 | 4/2019 | Motomitsu et al. | |
| 2021/0370723 A1 * | 12/2021 | Fukuda | B60C 11/0306 |

FOREIGN PATENT DOCUMENTS

| | | |
|---|---|---|
| CN | 107554201 | 1/2018 |
| EP | 75760 A2 * | 4/1983 |
| JP | H05-162511 | 6/1993 |
| JP | 2000-238507 | 9/2000 |
| JP | 2004-306872 | 11/2004 |
| JP | 2006-096062 | 4/2006 |
| JP | 2006-151083 | 6/2006 |
| JP | 2008-155817 | 7/2008 |
| JP | 2010-254222 | 11/2010 |
| JP | 2011-251685 | 12/2011 |
| JP | 2015-212119 | 11/2015 |
| JP | 2017-001612 | 1/2017 |
| JP | 2017-178234 | 10/2017 |
| WO | WO 2006/001202 | 1/2006 |
| WO | WO 2006/057169 | 6/2006 |
| WO | WO-2011/080565 A1 * | 7/2011 |
| WO | WO 2013/042257 | 3/2013 |
| WO | WO 2015/167007 | 11/2015 |
| WO | WO 2017/170562 | 10/2017 |

* cited by examiner

| | Conventional Example | Comparative Example 1 | Comparative Example 2 | Example 1 |
|---|---|---|---|---|
| Arrangement of two circumferential main grooves (Inner half or tread developed width in tire lateral direction) | Yes | Yes | Yes | Yes |
| Communication of shoulder lug grooves with circumferential main grooves | No | Yes | Yes | Yes |
| Presence of see-through portions of shoulder lug grooves | No | Yes | Yes | Yes |
| Presence of center lug grooves | No | Yes | Yes | Yes |
| Presence of center sipes | No | Yes | Yes | Yes |
| Angle $\theta_1$ of one sipe portion [°] | - | 25 | - | 0 |
| Angle $\theta_2$ of other sipe portion [°] | - | 30 | 85 | 50 |
| Presence of center circumferential narrow grooves | No | No | No | No |
| $D_1/D$ | - | - | - | - |
| Angle $\theta_6$ of center block portion end corner | 125 | 125 | 125 | 125 |
| Presence of chamfer | No | No | No | No |
| $D_2/D$ | - | - | - | 0.07 |
| $D_3/D$ | - | - | - | 0.07 |
| $W_2/W_1$ | - | 0.18 | 0.18 | 0.18 |
| $W_3/W_4$ | 0.20 | 0.20 | 0.20 | 0.20 |
| $W_3/TDW$ | 0.10 | 0.08 | 0.08 | 0.08 |
| Presence of shoulder circumferential narrow grooves | No | Yes | Yes | Yes |
| Presence of bent portions of shoulder circumferential narrow grooves | - | No | No | No |
| $D_4/D$ | - | 0.50 | 0.50 | 0.50 |
| Presence of narrow groove raised bottom portion | - | No | No | No |
| $D_5/D$ | - | - | - | - |
| Presence of lug groove raised bottom portion | - | No | No | No |
| $D_6/D$ | - | - | - | - |
| Heel-and-toe wear resistance performance | 100 | 97 | 95 | 106 |
| Traction performance on wet road surfaces | 100 | 103 | 105 | 104 |

FIG. 5A

| | Example 2 | Example 3 | Example 4 | Example 5 | Example 6 |
|---|---|---|---|---|---|
| Arrangement of two circumferential main grooves (Inner half or tread developed width in tire lateral direction) | Yes | Yes | Yes | Yes | Yes |
| Communication of shoulder lug grooves with circumferential main grooves | Yes | Yes | Yes | Yes | Yes |
| Presence of see-through portions of shoulder lug grooves | Yes | Yes | Yes | Yes | Yes |
| Presence of center lug grooves | Yes | Yes | Yes | Yes | Yes |
| Presence of center sipes | Yes | Yes | Yes | Yes | Yes |
| Angle $\theta_1$ of one sipe portion [°] | 5 | 15 | 5 | 5 | 5 |
| Angle $\theta_2$ of other sipe portion [°] | 50 | 50 | 35 | 60 | 50 |
| Presence of center circumferential narrow grooves | No | No | No | No | Yes |
| $D_1/D$ | - | - | - | - | 0.40 |
| Angle $\theta_6$ of center block portion end corner | 125 | 125 | 125 | 125 | 125 |
| Presence of chamfer | No | No | No | No | No |
| $D_2/D$ | 0.07 | 0.07 | 0.07 | 0.07 | 0.07 |
| $D_3/D$ | 0.07 | 0.07 | 0.07 | 0.07 | 0.07 |
| $W_2/W_1$ | 0.18 | 0.18 | 0.18 | 0.18 | 0.18 |
| $W_3/W_4$ | 0.20 | 0.20 | 0.20 | 0.20 | 0.20 |
| $W_3/TDW$ | 0.08 | 0.08 | 0.08 | 0.08 | 0.08 |
| Presence of shoulder circumferential narrow grooves | Yes | Yes | Yes | Yes | Yes |
| Presence of bent portions of shoulder circumferential narrow grooves | No | No | No | No | No |
| $D_4/D$ | 0.50 | 0.50 | 0.50 | 0.50 | 0.50 |
| Presence of narrow groove raised bottom portion | No | No | No | No | No |
| $D_5/D$ | - | - | - | - | - |
| Presence of lug groove raised bottom portion | No | No | No | No | No |
| $D_6/D$ | - | - | - | - | - |
| Heel-and-toe wear resistance performance | 105 | 103 | 106 | 102 | 107 |
| Traction performance on wet road surfaces | 105 | 106 | 104 | 106 | 107 |

FIG. 5B

|  | Example 7 | Example 8 | Example 9 | Example 10 | Example 11 |
|---|---|---|---|---|---|
| Arrangement of two circumferential main grooves (Inner half or tread developed width in tire lateral direction) | Yes | Yes | Yes | Yes | Yes |
| Communication of shoulder lug grooves with circumferential main grooves | Yes | Yes | Yes | Yes | Yes |
| Presence of see-through portions of shoulder lug grooves | Yes | Yes | Yes | Yes | Yes |
| Presence of center lug grooves | Yes | Yes | Yes | Yes | Yes |
| Presence of center sipes | Yes | Yes | Yes | Yes | Yes |
| Angle $\theta_1$ of one sipe portion [°] | 5 | 5 | 5 | 5 | 5 |
| Angle $\theta_2$ of other sipe portion [°] | 50 | 50 | 50 | 50 | 50 |
| Presence of center circumferential narrow grooves | Yes | Yes | Yes | Yes | Yes |
| $D_1/D$ | 0.50 | 0.70 | 0.50 | 0.50 | 0.50 |
| Angle $\theta_6$ of center block portion end corner | 125 | 125 | 35 | 50 | 65 |
| Presence of chamfer | No | No | Yes | Yes | Yes |
| $D_2/D$ | 0.07 | 0.07 | 0.07 | 0.07 | 0.07 |
| $D_3/D$ | 0.07 | 0.07 | 0.07 | 0.07 | 0.07 |
| $W_2/W_1$ | 0.18 | 0.18 | 0.18 | 0.18 | 0.18 |
| $W_3/W_4$ | 0.20 | 0.20 | 0.20 | 0.20 | 0.20 |
| $W_3/TDW$ | 0.08 | 0.08 | 0.08 | 0.08 | 0.08 |
| Presence of shoulder circumferential narrow grooves | Yes | Yes | Yes | Yes | Yes |
| Presence of bent portions of shoulder circumferential narrow grooves | No | No | No | No | No |
| $D_4/D$ | 0.50 | 0.50 | 0.50 | 0.50 | 0.50 |
| Presence of narrow groove raised bottom portion | No | No | No | No | No |
| $D_5/D$ | - | - | - | - | - |
| Presence of lug groove raised bottom portion | No | No | No | No | No |
| $D_6/D$ | - | - | - | - | - |
| Heel-and-toe wear resistance performance | 106 | 105 | 105 | 106 | 107 |
| Traction performance on wet road surfaces | 108 | 109 | 111 | 110 | 109 |

FIG. 5C

|  | Example 12 | Example 13 | Example 14 | Example 15 | Example 16 |
|---|---|---|---|---|---|
| Arrangement of two circumferential main grooves (Inner half or tread developed width in tire lateral direction) | Yes | Yes | Yes | Yes | Yes |
| Communication of shoulder lug grooves with circumferential main grooves | Yes | Yes | Yes | Yes | Yes |
| Presence of see-through portions of shoulder lug grooves | Yes | Yes | Yes | Yes | Yes |
| Presence of center lug grooves | Yes | Yes | Yes | Yes | Yes |
| Presence of center sipes | Yes | Yes | Yes | Yes | Yes |
| Angle $\theta_1$ of one sipe portion [°] | 5 | 5 | 5 | 5 | 5 |
| Angle $\theta_2$ of other sipe portion [°] | 50 | 50 | 50 | 50 | 50 |
| Presence of center circumferential narrow grooves | Yes | Yes | Yes | Yes | Yes |
| $D_1/D$ | 0.50 | 0.50 | 0.50 | 0.50 | 0.50 |
| Angle $\theta_6$ of center block portion end corner | 50 | 50 | 50 | 50 | 50 |
| Presence of chamfer | Yes | Yes | Yes | Yes | Yes |
| $D_2/D$ | 0.65 | 0.65 | 0.65 | 0.80 | 0.90 |
| $D_3/D$ | 0.40 | 0.50 | 0.65 | 0.50 | 0.50 |
| $W_2/W_1$ | 0.18 | 0.18 | 0.18 | 0.18 | 0.18 |
| $W_3/W_4$ | 0.20 | 0.20 | 0.20 | 0.20 | 0.20 |
| $W_3/TDW$ | 0.08 | 0.08 | 0.08 | 0.08 | 0.08 |
| Presence of shoulder circumferential narrow grooves | Yes | Yes | Yes | Yes | Yes |
| Presence of bent portions of shoulder circumferential narrow grooves | No | No | No | No | No |
| $D_4/D$ | 0.50 | 0.50 | 0.50 | 0.50 | 0.50 |
| Presence of narrow groove raised bottom portion | No | No | No | No | No |
| $D_5/D$ | - | - | - | - | - |
| Presence of lug groove raised bottom portion | No | No | No | No | No |
| $D_6/D$ | - | - | - | - | - |
| Heel-and-toe wear resistance performance | 111 | 110 | 109 | 110 | 109 |
| Traction performance on wet road surfaces | 112 | 113 | 114 | 116 | 117 |

FIG. 5D

|  | Example 17 | Example 18 | Example 19 | Example 20 | Example 21 |
|---|---|---|---|---|---|
| Arrangement of two circumferential main grooves (Inner half or tread developed width in tire lateral direction) | Yes | Yes | Yes | Yes | Yes |
| Communication of shoulder lug grooves with circumferential main grooves | Yes | Yes | Yes | Yes | Yes |
| Presence of see-through portions of shoulder lug grooves | Yes | Yes | Yes | Yes | Yes |
| Presence of center lug grooves | Yes | Yes | Yes | Yes | Yes |
| Presence of center sipes | Yes | Yes | Yes | Yes | Yes |
| Angle $\theta_1$ of one sipe portion [°] | 5 | 5 | 5 | 5 | 5 |
| Angle $\theta 2$ of other sipe portion [°] | 50 | 50 | 50 | 50 | 50 |
| Presence of center circumferential narrow grooves | Yes | Yes | Yes | Yes | Yes |
| $D_1/D$ | 0.50 | 0.50 | 0.50 | 0.50 | 0.50 |
| Angle $\theta_6$ of center block portion end corner | 50 | 50 | 50 | 50 | 50 |
| Presence of chamfer | Yes | Yes | Yes | Yes | Yes |
| $D_2/D$ | 0.80 | 0.80 | 0.80 | 0.80 | 0.80 |
| $D_3/D$ | 0.50 | 0.50 | 0.50 | 0.50 | 0.50 |
| $W_2/W_1$ | 0.20 | 0.30 | 0.40 | 0.30 | 0.30 |
| $W_3/W_4$ | 0.20 | 0.20 | 0.20 | 0.55 | 0.70 |
| $W_3/TDW$ | 0.08 | 0.08 | 0.08 | 0.08 | 0.08 |
| Presence of shoulder circumferential narrow grooves | Yes | Yes | Yes | Yes | Yes |
| Presence of bent portions of shoulder circumferential narrow grooves | No | No | No | No | No |
| $D_4/D$ | 0.50 | 0.50 | 0.50 | 0.50 | 0.50 |
| Presence of narrow groove raised bottom portion | No | No | No | No | No |
| $D_5/D$ | - | - | - | - | - |
| Presence of lug groove raised bottom portion | No | No | No | No | No |
| $D_6/D$ | - | - | - | - | - |
| Heel-and-toe wear resistance performance | 116 | 115 | 114 | 119 | 116 |
| Traction performance on wet road surfaces | 119 | 120 | 121 | 122 | 123 |

FIG. 6A

|  | Example 22 | Example 23 | Example 24 | Example 25 | Example 26 |
|---|---|---|---|---|---|
| Arrangement of two circumferential main grooves (Inner half or tread developed width in tire lateral direction) | Yes | Yes | Yes | Yes | Yes |
| Communication of shoulder lug grooves with circumferential main grooves | Yes | Yes | Yes | Yes | Yes |
| Presence of see-through portions of shoulder lug grooves | Yes | Yes | Yes | Yes | Yes |
| Presence of center lug grooves | Yes | Yes | Yes | Yes | Yes |
| Presence of center sipes | Yes | Yes | Yes | Yes | Yes |
| Angle $\theta_1$ of one sipe portion [°] | 5 | 5 | 5 | 5 | 5 |
| Angle $\theta_2$ of other sipe portion [°] | 50 | 50 | 50 | 50 | 50 |
| Presence of center circumferential narrow grooves | Yes | Yes | Yes | Yes | Yes |
| $D_1/D$ | 0.50 | 0.50 | 0.50 | 0.50 | 0.50 |
| Angle $\theta_6$ of center block portion end corner | 50 | 50 | 50 | 50 | 50 |
| Presence of chamfer | Yes | Yes | Yes | Yes | Yes |
| $D_2/D$ | 0.80 | 0.80 | 0.80 | 0.80 | 0.80 |
| $D_3/D$ | 0.50 | 0.50 | 0.50 | 0.50 | 0.50 |
| $W_2/W_1$ | 0.30 | 0.30 | 0.30 | 0.30 | 0.30 |
| $W_3/W_4$ | 0.85 | 0.70 | 0.70 | 0.70 | 0.70 |
| $W_3/TDW$ | 0.08 | 0.07 | 0.03 | 0.03 | 0.03 |
| Presence of shoulder circumferential narrow grooves | Yes | Yes | Yes | Yes | Yes |
| Presence of bent portions of shoulder circumferential narrow grooves | No | No | No | Yes | Yes |
| $D_4/D$ | 0.50 | 0.50 | 0.50 | 0.60 | 0.60 |
| Presence of narrow groove raised bottom portion | No | No | No | Yes | Yes |
| $D_5/D$ | - | - | - | 0.20 | 0.30 |
| Presence of lug groove raised bottom portion | No | No | No | No | No |
| $D_6/D$ | - | - | - | - | - |
| Heel-and-toe wear resistance performance | 117 | 120 | 118 | 124 | 123 |
| Traction performance on wet road surfaces | 124 | 124 | 125 | 125 | 125 |

FIG. 6B

|  | Example 27 | Example 28 | Example 29 | Example 30 |
|---|---|---|---|---|
| Arrangement of two circumferential main grooves (Inner half or tread developed width in tire lateral direction) | Yes | Yes | Yes | Yes |
| Communication of shoulder lug grooves with circumferential main grooves | Yes | Yes | Yes | Yes |
| Presence of see-through portions of shoulder lug grooves | Yes | Yes | Yes | Yes |
| Presence of center lug grooves | Yes | Yes | Yes | Yes |
| Presence of center sipes | Yes | Yes | Yes | Yes |
| Angle $\theta_1$ of one sipe portion [°] | 5 | 5 | 5 | 5 |
| Angle $\theta_2$ of other sipe portion [°] | 50 | 50 | 50 | 50 |
| Presence of center circumferential narrow grooves | Yes | Yes | Yes | Yes |
| $D_1/D$ | 0.50 | 0.50 | 0.50 | 0.50 |
| Angle $\theta_6$ of center block portion end corner | 50 | 50 | 50 | 50 |
| Presence of chamfer | Yes | Yes | Yes | Yes |
| $D_2/D$ | 0.80 | 0.80 | 0.80 | 0.80 |
| $D_3/D$ | 0.50 | 0.50 | 0.50 | 0.50 |
| $W_2/W_1$ | 0.30 | 0.30 | 0.30 | 0.30 |
| $W_3/W_4$ | 0.70 | 0.70 | 0.70 | 0.70 |
| $W_3/TDW$ | 0.03 | 0.03 | 0.03 | 0.03 |
| Presence of shoulder circumferential narrow grooves | Yes | Yes | Yes | Yes |
| Presence of bent portions of shoulder circumferential narrow grooves | Yes | Yes | Yes | Yes |
| $D_4/D$ | 0.60 | 0.60 | 0.60 | 0.60 |
| Presence of narrow groove raised bottom portion | Yes | Yes | Yes | Yes |
| $D_5/D$ | 0.50 | 0.30 | 0.30 | 0.30 |
| Presence of lug groove raised bottom portion | No | Yes | Yes | Yes |
| $D_6/D$ | - | 0.50 | 0.80 | 0.90 |
| Heel-and-toe wear resistance performance | 121 | 127 | 125 | 124 |
| Traction performance on wet road surfaces | 125 | 123 | 125 | 126 |

FIG. 6C

PNEUMATIC TIRE

TECHNICAL FIELD

The present technology relates to a pneumatic tire.

BACKGROUND ART

In the related art, for example, a heavy duty tire described in Japan Unexamined Patent Publication No. H05-162511 is designed to suppress the occurrence of heal-and-toe wear in small blocks and improve the wear resistance of the entire blocks. The heavy duty tire is provided with a main groove extending in a tire circumferential direction and a lateral groove intersecting the main groove in a tread surface, and blocks defined by the main groove and the lateral groove are formed. A plurality of sipes crossing the blocks in the tire circumferential direction are provided, and each sipe has a structure of not communicating with the main groove. The number of sipes provided in the block is three or more in the tire circumferential direction, and a sipe depth at both end portions in the tire circumferential direction is shallower than a sipe depth in the middle.

Further, for example, a heavy duty tire described in Japan Unexamined Patent Publication No. 2006-151083 is designed to improve wear resistance on wet and dry road surfaces. In the heavy duty tire, a pair of circumferential auxiliary grooves are formed on both sides of a tire equatorial plane in a tread surface, thus disposing one center land portion row. A distance between width center lines of the circumferential auxiliary grooves falls within a range of from 25% to 50% of a tread width. Lateral fine grooves connecting the circumferential auxiliary grooves are formed, and thus the center land portion row is formed of dummy block rows. Block rows defined by the circumferential auxiliary grooves and lug grooves are formed on both sides of the circumferential auxiliary grooves in a tire lateral direction. A negative ratio of the center land portion row and a negative ratio of the block rows fall within a range of from 10% to 20% and a range of from 15% to 27%, respectively. A groove depth of the circumferential auxiliary grooves and the lateral fine grooves falls within a range of from 70% to 100% of a groove depth of the lug grooves. A groove width of the circumferential auxiliary grooves and the lateral fine grooves fall within a range of from 5% to 15% and a range of from 3.5% to 4.5% of one pitch of the lug grooves, respectively. An average angle of the lug grooves with respect to the circumferential direction falls within a range of from 650 to 80°.

Also, for example, the pneumatic tire described in Japan Unexamined Patent Publication No. 2011-251685 is designed to achieve wet performance and wear resistance performance in a well-balanced manner. The pneumatic tire is provided with a lateral groove in a tread surface, and the lateral groove includes a first bent portion including: a first part in which a lateral groove center line passing through the middle between groove edges in the tread surface that is brought into contact with a road surface extends at an angle θ1 with respect to a tire lateral direction; and a second part being continuous with the first part and extending at an angle θ2 (≠θ1) with respect to the tire lateral direction. The lateral groove includes a second bent portion including a third part in which the lateral groove center line is continuous to the second part and extends at an angle θ3 (≠θ2) with respect to the tire axial direction. In a new tire, a bending angle θa0 of the first bent portion, which is indicated with |θ2-θ1|, falls within a range of from 30° to 50°. In a new tire, a bending angle θb0 of the second bent portion, which is indicated with |θ3-θ2|, falls within a range of from 30° to 50°. At the time of 50% wear, a bending angle θa50 of the first bent portion is from 0.35 times to 0.65 times of the angle θa0. At the time of 50% wear, a bending angle θb50 of the second bent portion is from 0.35 times to 0.65 times of the angle θb0. Moreover, in the tread surface, oblique narrow grooves inclined with respect to the tire circumferential direction are provided by extending between the lateral grooves adjacent to each other in the tire circumferential direction and by connecting the first bent portions and the second bent portions of the lateral grooves.

Incidentally, in a pneumatic tire used for wide area transportation, mainly urban transportation (particularly, a heavy duty pneumatic tire), lug grooves extending in a tire lateral direction are provided in a tread surface in order to improve traction performance on wet road surfaces. However, generally, in a pattern including the lug grooves as main components, block rigidity in a tire circumferential direction is more likely to be degraded, and heal-and-toe wear resistance performance tends to be degraded.

SUMMARY

The present technology provides a pneumatic tire capable of improving heal-and-toe wear resistance performance and traction performance.

The pneumatic tire according to one aspect of the present technology includes: at least two circumferential main grooves being provided and extending continuously along a tire circumferential direction in a tread surface, all of the circumferential main grooves being disposed in an inner half of a tread developed width in a tire lateral direction; shoulder land portions being formed outward of outermost circumferential main grooves in the tire lateral direction, the outermost circumferential main grooves being on outermost sides in the tire lateral direction; a plurality of shoulder lug grooves being provided to communicate with the outermost circumferential main grooves from outer edges of the tread surface in the tire lateral direction, being provided side by side in the tire circumferential direction, dividing the shoulder land portions into shoulder block portions, and each including a see-through portion in the tire lateral direction; a center land portion being defined by a pair of innermost circumferential main grooves on an innermost side in the tire lateral direction, the pair of innermost circumferential main grooves being adjacent to each other across a tire equator line; a plurality of center lug grooves being provided in the center land portion to communicate with each of the pair of innermost circumferential main grooves in the tire lateral direction, being provided side by side in the tire circumferential direction, and dividing the center land portion into a plurality of center block portions; and center sipes having both ends terminated in the plurality of center block portions. The center sipes each includes at least two sipe portions having different angles via at least one bent portion. An angle $\theta_1$ of at least one of the sipe portions with respect to the tire equator line satisfies $0° \leq \theta_1 \leq 15°$, and an angle $\theta_2$ of at least the other one of the sipe portions with respect to the tire equator line satisfies $35° \leq \theta_2 \leq 60°$.

Further, in the pneumatic tire according to one aspect of the present technology, the center land portion preferably includes a center circumferential narrow groove having both ends opening to the center lug grooves adjacent to each other in the tire circumferential direction, and a maximum groove depth D in the tread surface and a groove depth $D_1$ of the center circumferential narrow groove preferably satisfy a relationship of $0.40 \leq D_1/D \leq 0.70$.

Further, in the pneumatic tire according to one aspect of the present technology, the center block portion preferably has an acute corner portion at a part communicating with the center lug groove and the innermost circumferential main groove, and the acute corner portion preferably has a chamfer inclined inward in a tire radial direction from the tread surface.

Further, in the pneumatic tire according to one aspect of the present technology, the center lug groove preferably includes a center groove portion that transects the tire equator line and end groove portions that are continuous outward of the center groove portion in the tire lateral direction and that open to the innermost circumferential main grooves, and a maximum groove depth D in the tread surface, a groove depth $D_2$ of the center groove portion, and a groove depth $D_3$ of the end groove portions preferably satisfy relationships of $D_2 > D_3$, $0.65 \leq D_2/D \leq 0.90$, and $0.40 \leq D_3/D \leq 0.65$.

Further, in the pneumatic tire according to one aspect of the present technology, a groove width $W_1$ of the shoulder lug groove and a groove width $W_2$ of the center lug groove preferably satisfy a relationship of $0.20 \leq W_2/W_1 \leq 0.40$.

Further, in the pneumatic tire according to one aspect of the present technology, the innermost circumferential main grooves are preferably disposed to be offset in the tire lateral direction at parts communicating with the center lug grooves, and a groove width $W_3$ and an offset width $W_4$ of the innermost circumferential main groove preferably satisfy a relationship of $0.55 \leq W_3/W_4 \leq 0.85$.

Further, in the pneumatic tire according to one aspect of the present technology, a groove width $W_3$ of the innermost circumferential main groove and a tread developed width TDW preferably satisfy a relationship of $0.01 \leq W_3/TDW \leq 0.07$.

Further, in the pneumatic tire according to one aspect of the present technology, the shoulder block portion preferably extends in the tire circumferential direction in a shape that allows the shoulder lug grooves adjacent to each other in the tire circumferential direction to communicate with each other and preferably includes a shoulder circumferential narrow groove including a bent portion in a midway, and a groove depth $D_4$ of the shoulder circumferential narrow groove and a maximum groove depth D in the tread surface preferably satisfy a relationship of $0.60 \leq D_4/D \leq 0.90$.

Further, in the pneumatic tire according to one aspect of the present technology, the shoulder block portion preferably extends in the tire circumferential direction in a shape that allows the shoulder lug grooves adjacent to each other in the tire circumferential direction to communicate with each other and preferably includes a shoulder circumferential narrow groove including a bent portion in a midway, the shoulder circumferential narrow groove includes a narrow groove raised bottom portion on a groove bottom at a part communicating with each of the shoulder lug grooves, and a groove depth $D_5$ of the narrow groove raised bottom portion and a maximum groove depth D in the tread surface preferably satisfy a relationship of $0.20 \leq D_5/D \leq 0.50$.

Further, in the pneumatic tire according to one aspect of the present technology, the shoulder lug groove includes a lug groove raised bottom portion on a groove bottom, and a groove depth $D_6$ of the lug groove raised bottom portion and a maximum groove depth D in the tread surface preferably satisfy a relationship of $0.50 \leq D_6/D \leq 0.90$.

According to the present technology, the circumferential main grooves all of which are disposed in the inner half of the tread developed width of the tread surface in the tire lateral direction; the shoulder lug grooves that divide the shoulder land portions into the shoulder block portions and that each include the see-through portion; and the center lug grooves that divide the center land portion into the center block portions are included. Thus, due to the drainage performance of the shoulder lug grooves and the center lug grooves and an edge effect exerted by the division of the shoulder block portions and the center block portions, traction performance on wet road surfaces can be improved. Moreover, when the center sipe having both ends terminated in the center block portion is provided, a contact pressure in the center block portion is released. Thus, heal-and-toe wear resistance performance can be improved. Particularly, with the sipe portion satisfying $0° \leq \theta_1 \leq 15°$, which is close to the tire equator line, heal-and-toe wear resistance performance is improved while suppressing excessive reduction of block rigidity in the tire circumferential direction. With an edge effect of the sipes having an angle satisfying $35° \leq \theta_2 \leq 60°$ with respect to the tire equator line, traction performance on wet road surfaces is improved. Thus, heal-and-toe wear resistance performance and traction performance can be achieved in a well-balanced manner.

BRIEF DESCRIPTION OF DRAWINGS

FIGS. 5A-5D include a table showing the results of performance tests of pneumatic tires according to examples of the present technology.

FIGS. 6A-6C include a table showing the results of performance tests of pneumatic tires according to examples of the present technology.

DETAILED DESCRIPTION

Now, with reference to the drawings, an embodiment of the present technology is described, but the present technology is not limited thereto. Further, constituent elements described in the following embodiment can be combined, or a part of the constituent elements may not be used.

In the following description, a tire lateral direction refers to a direction that is parallel with the rotation axis of a pneumatic tire. Inward in the tire lateral direction refers to a direction toward a tire equatorial plane in the tire lateral direction. Outward in the tire lateral direction refers to a direction opposite the direction toward the tire equatorial plane in the tire lateral direction. Further, a tire radial direction refers to a direction orthogonal to the tire rotation axis. Inward in the tire radial direction refers to a direction toward the tire rotation axis in the tire radial direction. Outward in the tire radial direction refers to a direction away from the tire rotation axis in the tire radial direction. Further, a tire circumferential direction refers to a direction of rotation about the tire rotation axis.

The tire equatorial plane refers to a plane orthogonal to the tire rotation axis and passing through the center in the tire lateral direction, and the tire equator line refers to a center line at which the tire equatorial plane and a surface of a tread portion of the pneumatic tire intersect. In the present embodiment, the tire equator line and the tire equatorial plane are denoted with the same reference sign "CL".

A pneumatic tire 1 according to the present embodiment is a tubeless tire. Further, the pneumatic tire 1 according to the present embodiment is a heavy duty pneumatic tire that is mounted to a truck and a bus. A tire for a truck and a bus (heavy duty pneumatic tire) refers to a tire defined in Chapter C in "JATMA YEAR BOOK" issued by Japan Automobile Tire Manufacturers Association (JATMA). Note that the pneumatic tire 1 may be mounted to a passenger car and a light truck.

Figure 1:
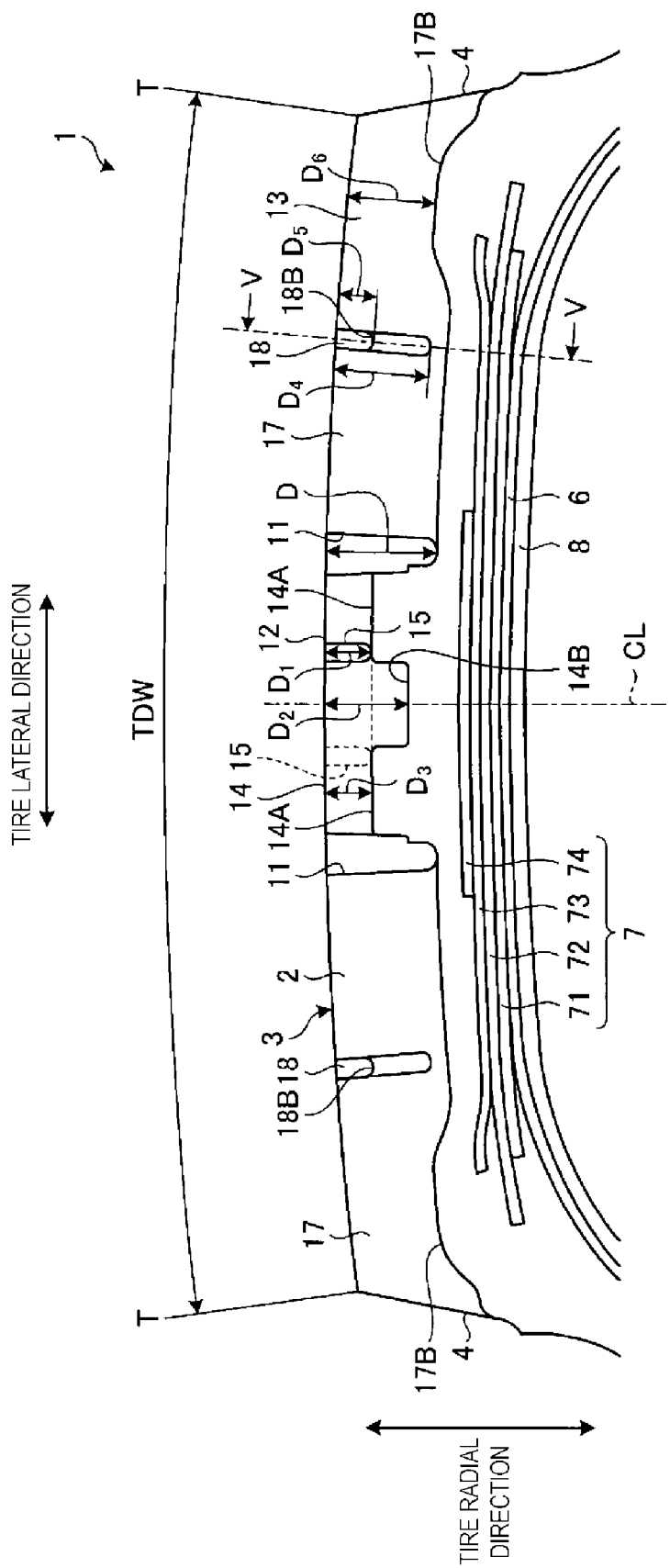
FIG. 1 is a meridian cross-sectional view of a pneumatic tire according to an embodiment of the present technology.

FIG. 1 is a meridian cross-sectional view of a pneumatic tire according to the present embodiment. The meridian cross-section is the cross-section passing through the tire rotation axis.

In a meridian cross-sectional view, in the pneumatic tire 1 illustrated in FIG. 1, a tread portion 2 formed of a rubber material is disposed in the outermost portion in the tire radial direction. Both ends of the tread portion 2 in the tire lateral direction are formed as shoulder portions 4.

Although not illustrated, sidewall portions are disposed from the shoulder portions 4 to predetermined positions inward in the tire radial direction. The sidewall portions are disposed at two positions on both sides of the pneumatic tire 1 in the tire lateral direction. Further, although not illustrated, a bead portion is positioned inward of each of the sidewall portions in the tire radial direction. Similarly, towards the sidewall portions, the bead portions are disposed at two positions on both sides of the tire equatorial plane CL. Specifically, a pair of the bead portions are disposed on both sides of the tire equatorial plane CL in the tire lateral direction. The bead portion is provided with a bead core. The bead core is formed by winding a bead wire, which is a steel wire, into a ring shape. The bead portion is formed so as to be mounted to a specified rim with a 15-degree taper. The specified rim referred to herein refers to an "applicable rim" specified by JATMA, a "Design Rim" specified by TRA (The Tire and Rim Association, Inc.), or a "Measuring Rim" specified by ETRTO (European Tire and Rim Technical Organization). Specifically, in the pneumatic tire 1 according to the present embodiment, a portion to be fitted to the bead portion, which is inclined at an inclination angle of 15° with respect to the rotation axis, can be mounted to a specified rim.

A belt layer 7 is provided inward of the tread portion 2 in the tire radial direction. For example, the belt layer 7 has a multilayer structure in which four layers including belts 71, 72, 73, and 74 are layered. The belts 71, 72, 73, and 74 are formed by performing a rolling process on a plurality of coating rubber-covered belt cords made of steel. Further, an inclination angle of the belts 71, 72, 73, and 74 with respect to the tire circumferential direction is set to fall within a range of from 15° to 70°, for example. The belts 72 and 73 among the belt layer 7 having a plurality of layers, which are the second layer and the third layer from a tire inner circumferential side, function as reinforcing layers and are arranged such that the belt cords intersect between the layers. Those belts 72 and 73 refer to cross belts. Note that, between the belts 71 and 72 being the first layer and the second layer from the tire inner circumferential side, the belt cords are inclined in the same direction. Between the belts 73 and 74 being the third layer and the fourth layer from the tire inner circumferential side, the belt cords are inclined also in the same direction.

A carcass layer 6 that encapsulates cords of a radial ply is continuously provided inward of the belt layer 7 in the tire radial direction and in an inner portion of the sidewall portions. The carcass ply of the carcass layer 6 is formed by performing a rolling process on coating rubber-covered carcass cords made of steel. The carcass layer 6 is supported by a pair of the bead cores. The carcass layer 6 has a single layer structure made of one carcass ply and extends in a toroidal shape in the tire circumferential direction, between the bead cores disposed on both sides in the tire lateral direction, forming the framework of the pneumatic tire 1. Specifically, the carcass layer 6 is disposed from one bead portion to the other bead portion of the pair of bead portions positioned on both sides in the tire lateral direction, and the carcass layer 6 turns back outward in the tire lateral direction along the bead cores, wrapping the bead cores. Specifically, the carcass layer 6 passes through inward of the bead cores in the tire radial direction from inward of the bead cores in the tire lateral direction, and the carcass layer 6 is folded back at the bead cores such that ends are disposed outward of the bead cores in the tire lateral direction.

Additionally, an innerliner 8 is formed along the carcass layer 6, inward of the carcass layer 6 or on the inner side of the carcass layer 6 with respect to the pneumatic tire 1. The innerliner 8 is a tire inner surface, that is, an inner circumferential surface of the carcass layer 6, has both end portions in the tire lateral direction each of which reaches a lower part of the bead core or a bead toe of the pair of bead portions, and is wound in a toroidal shape in the tire circumferential direction and bonded to the bead portions. The innerliner 8 does not have cords because the innerliner 8 is provided to suppress the permeation of air molecules.

Figure 2:
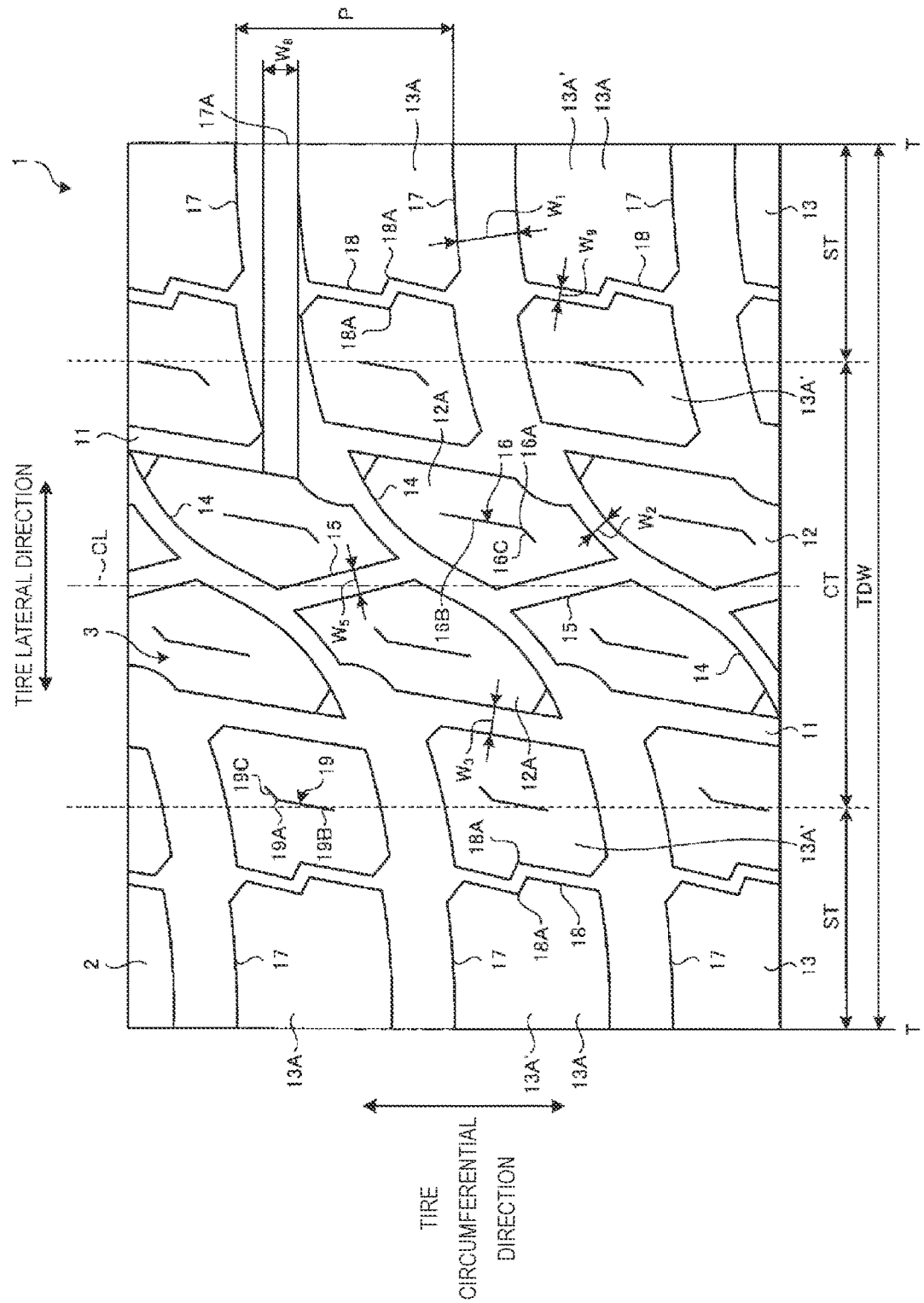
FIG. 2 is a plan view of the pneumatic tire according to the embodiment of the present technology.
Figure 3:
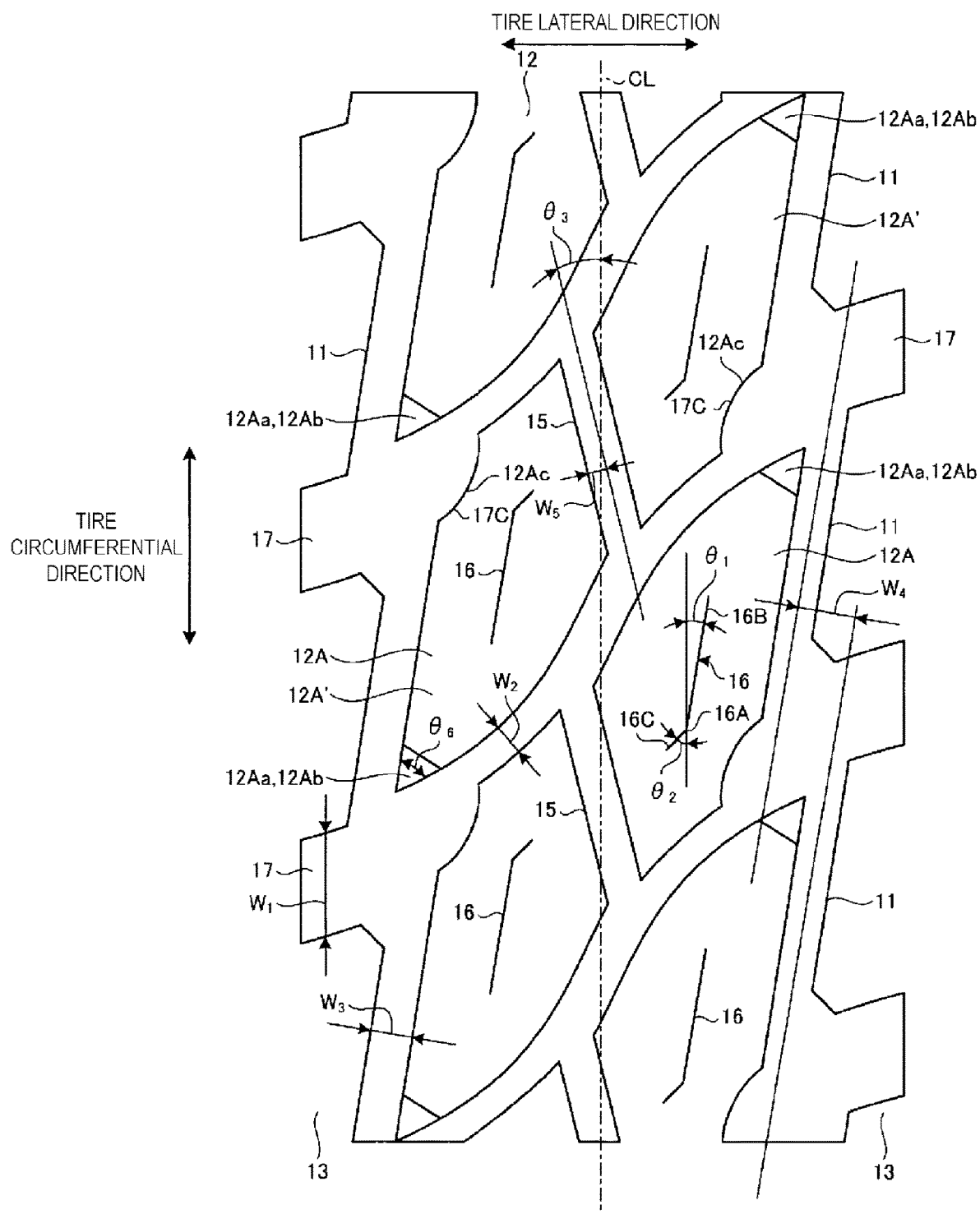
FIG. 3 is a partially enlarged plan view of the pneumatic tire according to the embodiment of the technology.
Figure 4:
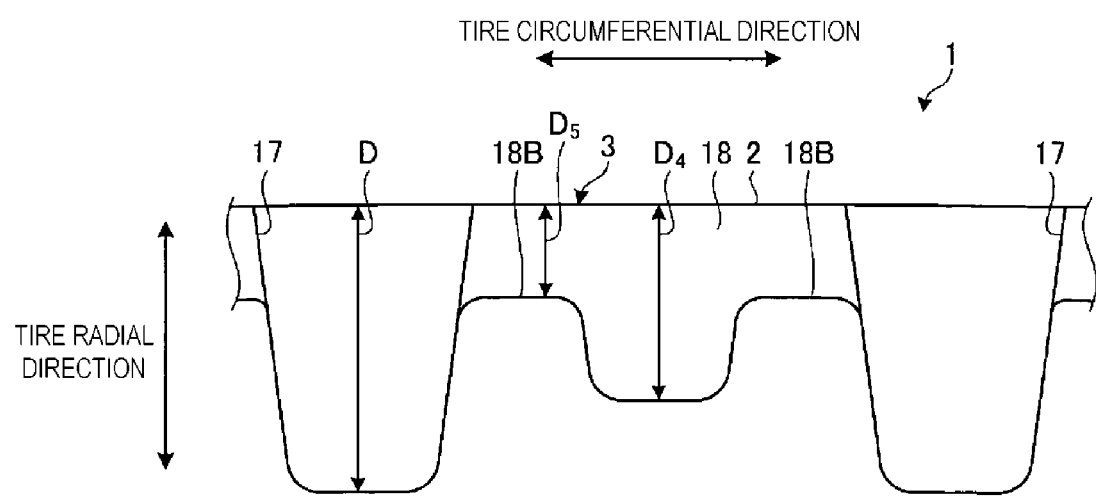
FIG. 4 is an enlarged view taken along the line V-V of FIG. 1.

FIG. 2 is a plan view of the pneumatic tire according to the present embodiment. FIG. 3 is a partially enlarged plan view of the pneumatic tire according to the present embodiment. FIG. 4 is an enlarged view taken along the line V-V of FIG. 1.

The surface of the tread portion 2, that is, a portion brought into contact with road surfaces when a vehicle to which the pneumatic tire 1 is mounted travels, is formed as a tread surface 3. A plurality of circumferential main grooves 11 continuously extending along the tire circumferential direction are arranged side by side in the tire lateral direction in the tread surface 3. In the drawing, at least two circumferential main grooves 11 are provided, and two grooves are illustrated as the circumferential main grooves 11. When an inner half of the tread developed width TDW of the tread surface 3 in the tire lateral direction is referred to as a center region CT and an outer half of the tread developed width TDW of the tread surface 3 in the tire lateral direction is referred to as a shoulder region ST, all the circumferential main grooves 11 are disposed in the center region CT. Being arranged in the center region CT indicates that the entire circumferential main grooves 11 are included in the center region CT. Further, the circumferential main groove 11 is a groove having a groove depth D satisfying 10 mm≤D and a groove width $W_3$ satisfying 5 mm<$W_3$. A pair of the circumferential main grooves 11 adjacent to each other across a tire equator line CL are innermost circumferential main grooves disposed at innermost positions in the tire lateral direction, and a pair of innermost circumferential main grooves define a center land portion 12 on the tire equator line CL. Further, a pair of the circumferential main grooves 11 are outermost circumferential main grooves on both sides disposed at outermost positions in the tire lateral direction, and shoulder land portions 13 are defined outward of the outermost circumferential main grooves in the tire lateral direction. In the drawing, the same structure formed of the circumferential main groove 11 is illustrated as the innermost circumferential main groove and the outermost circumferential main groove, and hence the innermost circumferential main groove and the outermost circumferential main groove are denoted with the same reference sign "11".

Here, the tread developed width TDW refers to a length along a profile of a meridian cross-section of the tread surface 3 between outer edges T of the tread surface 3 in the tire lateral direction when the pneumatic tire 1 is mounted to a specified rim with a specified air pressure in an unloaded state. The outer edges T of the tread surface 3 in the tire lateral direction also refer to developed width edges of the tread developed width TDW, which are ground contact edges. The ground contact edges refer to both ends of a ground contact width in the tire lateral direction when the ground contact width refers to a maximum linear distance in a tire axial direction (tire lateral direction) of a contact surface with a flat plate when the pneumatic tire is mounted to a specified rim with a specified air pressure, is placed vertically on the flat plate in a static state, and is applied with a load equivalent to a regular mass. Note that, the specified rim refers to an "applicable rim" specified by JATMA, a "Design Rim" specified by TRA, or a "Measuring Rim" specified by ETRTO. Further, the specified internal pressure refers to the maximum air pressure specified by JATMA, the maximum value described in "TIRE LOAD LIMITS AT VARIOUS COLD INFLATION PRESSURES" specified by TRA, or "INFLATION PRESSURES" specified by ETRTO.

In the center land portion 12 defined by the innermost circumferential main grooves 11, center lug grooves 14 are formed. The center lug groove 14 is provided to have both ends opening to each of the innermost circumferential main grooves 11 so as to communicate with each of the inner circumferential main grooves 11 in the tire lateral direction, and a plurality of the center lug grooves 14 are provided side by side in the tire circumferential direction. Therefore, the center land portion 12 formed on the tire equator line CL is divided by each of the center lug grooves 14 into a plurality of center block portions 12A arranged side by side in the tire circumferential direction.

As illustrated in FIG. 1, the center lug groove 14 includes end groove portions 14A and a center groove portion 14B. The end groove portions 14A are grooves at both ends of the center lug groove 14 and each have one end opening to the pair of innermost circumferential main grooves 11 and the other end reaching the center land portion 12. The center groove portion 14B is disposed to transect the tire equator line CL, has both ends provided in the center land portion 12, and is connected to the other ends of the end groove portions 14A. Therefore, in the center lug groove 14, the other ends of the end groove portions 14A are connected to both ends of the center groove portion 14B disposed on the tire equator line CL, and the ends of the end groove portions 14A are provided to be connected to each of the innermost circumferential main grooves 11. The center lug groove 14 (the end groove portions 14A and the center groove portion 14B) is a groove having a groove width $W_2$ (see FIG. 2 and FIG. 3) satisfying 4 mm≤$W_2$≤10 mm, a groove depth $D_3$ (see FIG. 1) of the end groove portions 14A satisfying 7 mm≤$D_3$≤15 mm, and a groove depth $D_2$ (see FIG. 1) of the center groove portion 14B satisfying 15 mm≤$D_2$≤20 mm. Further, the groove depth $D_2$ of the center groove portion 14B is deeper than the groove depth $D_3$ of the end groove portions 14A.

Further, the center lug groove 14 is disposed obliquely with respect to the tire circumferential direction, the opening positions of the end groove portions 14A in the innermost circumferential main grooves 11 are deviated in the tire circumferential direction, and the end groove portions 14A are curved in directions that are curved opposite to each other in the tire circumferential direction. Thus, the center lug groove 14 is formed to be curved in a S-like shape as a whole between the innermost circumferential main grooves 11. Thus, as illustrated in FIG. 3, the center block portions 12A obtained by being divided by the center lug grooves 14 are disposed obliquely with respect to the tire circumferential direction and the tire lateral direction. Thus, at a part of each of the center lug grooves 14 communicating with each of the innermost circumferential main grooves 11, an acute corner portion 12Aa having a sharp end in the tire circumferential direction is formed. Further, at the acute corner portion 12Aa of the center block portion 12A, a chamfer 12Ab is formed to be inclined inward in the tire radial direction from the tread surface 3 toward the corner. Further, as illustrated in FIG. 3, the center block portions 12A obtained by being divided by the center lug grooves 14 are disposed obliquely with respect to the tire circumferential direction and the tire lateral direction. Thus, at a part of each of the center lug grooves 14 communicating with each of the innermost circumferential main grooves 11, an obtuse corner portion 12Ac having a sharp end in the tire circumferential direction is formed in the midway in the tire circumferential direction.

Further, the innermost circumferential main grooves 11 defining the center land portion 12 are disposed to be offset in parallel with the tire lateral direction at the parts communicating with the center lug grooves 14. Specifically, the innermost circumferential main grooves 11 are formed in a zigzag shape along the tire circumferential direction due to their own offset and being communicating with the center lug grooves 14.

As illustrated in FIGS. 2 and 3, center circumferential narrow grooves 15 are formed in the center block portions 12A. The center circumferential narrow groove 15 is provided to have both ends opening to the center lug grooves 14 adjacent to each other in the tire circumferential direction and communicates with the center lug grooves 14 adjacent to each other in the tire circumferential direction. The center circumferential narrow groove 15 is connected to the center lug grooves 14 adjacent in the tire circumferential direction, is opening to the part of the end groove portion 14A connecting with the center groove portion 14B in the one center lug groove 14 and the part of the end groove portion 14A connecting with the center groove portion 14B in the other center lug groove 14, and is disposed to transect the tire equator line CL. Specifically, while transecting the tire equator line CL, the center circumferential narrow groove 15 has: one end, which is connected to the part of the end groove portion 14A connecting with the center groove portion 14B in the one center lug groove 14 adjacent in the tire circumferential direction on one side across the tire equator line CL; and the other end, which is connected to the part of the end groove portion 14A connecting with the center groove portion 14B in the other center lug groove 14 adjacent in the tire circumferential direction on the other side across the tire equator line CL. Further, the center block portion 12A is divided by the center circumferential narrow groove 15 into small center block portions 12A' in the tire lateral direction. The center circumferential narrow groove 15 is a groove having a groove depth $D_1$ (see FIG. 1) satisfying 7 mm≤$D_1$≤15 mm and a groove width $W_5$ (see FIGS. 2 and 3) satisfying 2 mm≤$W_5$≤8 mm.

Further, as described above, the center lug grooves 14 are disposed obliquely with respect to the tire circumferential direction, and the center block portions 12A are disposed obliquely with respect to the tire circumferential direction and the tire lateral direction. Thus, the small center block portions 12A' defined by the center lug grooves 14 and the center circumferential narrow grooves 15 are disposed in a staggered shape in the tire circumferential direction and the tire lateral direction across the tire equator line CL.

Further, as illustrated in FIGS. 2 and 3, center sipes 16 are formed in the center block portions 12A. In the present embodiment, one center sipe 16 is formed in each of the small center block portions 12A'. Further, when the center circumferential narrow groove 15 is not provided, two center sipes 16 are formed across the tire equator line CL in the center block portion 12A. The center sipe 16 is provided with both ends terminated in the center block portion 12A (small center block portion 12A'). Further, the center sipe 16 includes at least one bent portion 16A and at least two sipe portions 16B and 16C. In the present embodiment, the center sipe 16 includes one bent portion 16A and two linear sipe portions 16B and 16C. Further, the one sipe portion 16B mainly extends along the tire circumferential direction (tire equator line CL), and an angle θ1 (see FIG. 3) with respect to the tire circumferential direction (tire equator line CL) satisfies $0° \leq \theta_1 \leq 15°$. The angle $\theta_1$ is an angle formed with a center line (not shown) passing through the center of the groove width of the one sipe portion 16B. Further, the other sipe portion 16C has an angle $\theta_2$ (see FIG. 3) with respect to the tire circumferential direction (tire equator line CL), which is larger than the one sipe portion 16B and satisfies $35° \leq \theta_2 \leq 60°$. The angle $\theta_2$ is an angle formed with a center line (not shown) passing through the center of the groove width of the other sipe portion 16C. The center sipe 16 (sipe portions 16B and 16C) is a groove having a groove depth $D_7$ (not shown) satisfying 9 mm $\leq D_7 \leq$ 17 mm and a groove width $W_7$ (not shown) satisfying 0.4 mm $\leq W_7 \leq$ 1.0 mm.

In the shoulder land portions 13 defined by the outermost circumferential main grooves 11, shoulder lug grooves 17 are formed. The shoulder lug groove 17 is provided from the outer edge T in the tire lateral direction so as to communicate with the outermost circumferential main groove 11, and a plurality of the shoulder lug grooves 17 are provided side by side in the tire circumferential direction. Therefore, the shoulder land portions 13 are divided by the shoulder lug grooves 17 into a plurality of shoulder block portions 13A arrayed in the tire circumferential direction. Further, the shoulder lug groove 17 includes a see-through portion 17A in the tire lateral direction. The see-through portion 17A is formed such that, when viewed in the tire lateral direction from the outer edge T in the tire lateral direction or the outermost circumferential main groove 11, the outermost circumferential main groove 11 or the outer edge T in the tire lateral direction that is positioned on the opposite side can be seen through without interference of its own groove wall. The shoulder lug groove 17 is a groove having the groove depth D satisfying (see FIG. 4) 14 mm $\leq D \leq$ 28 mm and a groove width $W_1$ (see FIGS. 2 and 3) satisfying 10 mm $\leq W_1 \leq$ 20 mm. Here, the groove depth of the shoulder lug groove 17 is equivalent to the groove depth of the circumferential main groove 11 described above and is the maximum groove depth for all the grooves formed in the tread surface 3. Thus, the groove depth of the shoulder lug groove 17 and the circumferential main groove 11 is denoted with a reference sign "D". Further, a width $W_8$ of the see-through portion 17A of the shoulder lug groove 17 in the tire circumferential direction satisfies 5 mm $\leq W_8 \leq$ 15 mm. Further, when the innermost circumferential main groove and the outermost circumferential main groove are present as the circumferential main grooves 11, the shoulder lug groove 17 preferably communicates with the innermost circumferential main groove in order to improve traction performance on wet road surfaces.

The shoulder lug groove 17 includes a lug groove raised bottom portion 17B on a groove bottom. The lug groove raised bottom portion 17B is provided in the shoulder region ST in the shoulder lug groove 17 and is provided in the midway outward of a shoulder circumferential narrow groove 18 described later in the tire lateral direction. The lug groove raised bottom portion 17B has a minimum groove depth $D_6$ (see FIG. 1) that satisfies 11 mm $\leq D_6 \leq$ 22 mm and is smaller than the groove depth D of the shoulder lug groove 17 (the maximum groove depth).

Further, when the number of circumferential main grooves 11 are two or the shoulder lug groove 17 communicates with the innermost circumferential main groove 11, the part communicating with the circumferential main groove (innermost circumferential main groove) 11 matches with the part of the center lug groove 14 communicating with the circumferential main groove (innermost circumferential main groove) 11. Specifically, in a case of such configuration, the shoulder lug groove 17 and the center lug groove 14 are integrated and are provided continuously in the tire lateral direction between the outer edges T in the tire lateral direction. Further, the shoulder lug groove 17 has a part communicating with the circumferential main groove (innermost circumferential main groove) 11 so as to bite the obtuse corner portion 12Ac of the center block portions 12A described above. In the biting part, a cutout 17C is formed so as to cut out the obtuse corner portion 12Ac. When the cutout 17C is formed, traction performance on wet road surfaces can be improved along with improvement in drainage performance due to increase in the volume of the shoulder lug groove 17.

The shoulder circumferential narrow groove 18 is formed in the shoulder block portion 13A. The shoulder circumferential narrow groove 18 extend continuously in the tire circumferential direction in a shape that allows the shoulder lug grooves 17 to communicate with each other. The shoulder circumferential narrow groove 18 is provided in the shoulder region ST. Therefore, the shoulder circumferential narrow groove 18 divides the shoulder block portion 13A in the tire lateral direction into small shoulder block portions 13A'. Further, the shoulder circumferential narrow groove 18 includes at least two bent portions 18A in the midway (center portion) and is formed in a zigzag shape in the tire circumferential direction. The shoulder circumferential narrow groove 18 is a groove having a groove depth $D_4$ (see FIG. 1) satisfying 11 mm $\leq D_4 \leq$ 24 mm and a groove width $W_9$ (see FIG. 2) satisfying 1 mm $\leq W_9 \leq$ 5 mm.

Further, as illustrated in FIGS. 1 and 4, the shoulder circumferential narrow groove 18 includes a narrow groove raised bottom portion 18B at the end opening to the shoulder lug groove 17. The groove depth $D_4$ described above is the deepest groove depth of the center portion other than the narrow groove raised bottom portion 18B. Further, the narrow groove raised bottom portion 18B has a groove depth $D_5$ (see FIG. 1) satisfying 4 mm $\leq D_5 \leq$ 9 mm.

As illustrated in FIG. 2, in the small shoulder block portion 13A' inward in the tire lateral direction, a shoulder sipe 19 is formed. The shoulder sipe 19 is provided to have both ends terminated in the small shoulder block portion 13A'. Further, one shoulder sipe 19 is provided in the small shoulder block portion 13A'. In the present embodiment, the shoulder sipe 19 is provided in the small shoulder block portion 13A' inward in the tire lateral direction. Further, the shoulder sipe 19 includes at least one bent portion 19A and at least two sipe portions 19B and 19C. In the present embodiment, the shoulder sipe 19 includes one bent portion 19A and two linear sipe portions 19B and 19C. Further, the one sipe portion 19B mainly extends along the tire circumferential direction (tire equator line CL) and has an angle $\theta_4$ (not shown) with respect to the tire circumferential direction (tire equator line CL) satisfies $0° \le \theta_4 \le 15°$. The angle $\theta_4$ is an angle formed with a center line passing through the center of the groove width of the one sipe portion 19B. Further, the other sipe portion 19C has an angle $\theta_5$ (not shown) with respect to the tire circumferential direction (tire equator line CL), which is larger than the one sipe portion 19B and satisfies $35° \le \theta_5 \le 60°$. The angle $\theta_5$ is an angle formed with a center line (not shown) passing through the center of the groove width of the other sipe portion 19C. The shoulder sipe 19 (sipe portions 19B and 19C) is a groove having a groove depth $D_8$ (not shown) satisfying 9 mm $\le D_8 \le$ 17 mm and a groove width $W_{10}$ (not shown) satisfying 0.4 mm $\le W_{10} \le$ 1.0 mm.

As in the configuration described above, the pneumatic tire 1 according to the present embodiment includes: at least two of the circumferential main grooves 11 being provided and extending continuously along the tire circumferential direction in the tread surface 3, all of the circumferential main grooves 11 being disposed in the inner half of the tread developed width TDW in the tire lateral direction; the shoulder land portions 13 being formed outward of the outermost circumferential main grooves 11 in the tire lateral direction, the outermost circumferential main grooves 11 being on outermost sides in the tire lateral direction; the plurality of shoulder lug grooves 17 being provided to communicate with the outermost circumferential main grooves 11 from the outer edges T of the tread surface 3 in the tire lateral direction, being provided side by side in the tire circumferential direction, dividing the shoulder land portions 13 into the shoulder block portions 13A, and each including the see-through portion 17A in the tire lateral direction; the center land portion 12 being defined by the pair of innermost circumferential main grooves 11 on an innermost side in the tire lateral direction, the pair of innermost circumferential main grooves 11 being adjacent to each other across the tire equator line CL; the plurality of center lug grooves 14 being provided in the center land portion to communicate with each of the innermost circumferential main grooves 11 12 in the tire lateral direction, being provided side by side in the tire circumferential direction, and dividing the center land portion 12 into the plurality of center block portions 12A; and the center sipes 16 having both ends terminated in the center block portions 12A. The center sipes 16 each includes at least the two sipe portions 16B and 16C having different angles via at least the one bent portion 16A. The angle $\theta_1$ of at least the one sipe portion 16B with respect to the tire equator line CL satisfies $0° \le \theta_1 \le 15°$, and the angle $\theta_2$ of at least the other sipe portion 16C with respect to the tire equator line CL satisfies $35° \le \theta_2 \le 60°$.

According to the pneumatic tire 1, the circumferential main grooves 11 all of which are disposed in the inner half of the tread developed width TDW of the tread surface 3 in the tire lateral direction; the shoulder lug grooves 17 that divide the shoulder land portions 13 into the shoulder block portions 13A and that each include the see-through portion 17A; and the center lug grooves 14 that divide the center land portion 12 into the center block portions 12A are included. Thus, due to the drainage performance of the shoulder lug grooves 17 and the center lug grooves 14 and an edge effect exerted by the division of the shoulder block portions 13A and the center block portions 12A, traction performance on wet road surfaces can be improved. Further, the center sipe 16 having both ends terminated in the center block portion 12A is provided, and thus a contact pressure in the center block portion 12A is released. Thus, heal-and-toe wear resistance performance can be improved. Particularly, with the sipe portion 16B satisfying $0° \le \theta_1 \le 15°$, which is close to the tire equator line CL, heal-and-toe wear resistance performance is improved while suppressing excessive reduction of block rigidity in the tire circumferential direction. With an edge effect of the sipe 16C having an angle satisfying $35° \le \theta_2 \le 60°$ with respect to the tire equator line CL, traction performance on wet road surfaces is improved. Thus, heal-and-toe wear resistance performance and traction performance can be achieved in a well-balanced manner.

Further, in the pneumatic tire 1 according to the present embodiment, with regard to a relationship between the one sipe portion 16B at the angle $\theta_1$ and the other sipe portion 16C at the angle $\theta_2$ in the center sipe 16, a length $L_1$ of the one sipe portion 16B is preferably formed to be longer than a length $L_2$ of the other sipe portion 16C, and the length $L_1$ of the one sipe portion 16B and the length $L_2$ of the other sipe portion 16C preferably satisfy a relationship of $0.10 \le L_2/L_1 \le 0.30$. According to the pneumatic tire 1, an edge effect can be exerted without causing degradation in block rigidity, and thus heal-and-toe wear resistance performance and traction performance can be achieved in a well-balanced manner.

Further, in the pneumatic tire 1 according to the present embodiment, the groove depth $D_7$ of the center sipe 16 and the maximum groove depth D in the tread surface 3 preferably satisfy a relationship of $0.3 \le D_7/D \le 0.9$. According to the pneumatic tire 1, the groove depth $D_7$ of the center sipe 16 is defined with respect to the maximum groove depth D, a contact pressure in the center block portion 12A can be released effectively, and heal-and-toe wear resistance performance can be improved. Note that, in order to release a contact pressure in the center block portion 12A more effectively, a relationship of $0.5 \le D_7/D \le 0.7$ is preferably satisfied. It is assumed that the groove depth $D_7$ is the maximum groove depth.

Further, in the pneumatic tire 1 according to the present embodiment, the width $W_8$ of the see-through portion 17A of the shoulder lug groove 17 in the tire circumferential direction and a pitch length P (see FIG. 2) of the shoulder block portion 13A in the tire circumferential direction, which is defined by the shoulder lug groove 17 including the see-through portion 17A, preferably satisfy a relationship of $0.10 \le W_8/P \le 0.25$. According to the pneumatic tire 1, the interrelation between the see-through portion 17A and the pitch length of the shoulder block portion 13A is optimized. With this, while maintaining heal-and-toe wear resistance performance, traction performance on wet road surfaces can further be improved.

Further, in the pneumatic tire 1 according to the present embodiment, the center land portion 12 preferably includes the center circumferential narrow groove 15 having both ends opening to the center lug grooves 14 adjacent to each other in the tire circumferential direction, and the maximum groove depth D in the tread surface 3 and the groove depth $D_1$ of the center circumferential narrow groove 15 preferably satisfy a relationship of $0.40 \le D_1/D \le 0.70$. In the pneumatic tire 1, the center circumferential narrow groove 15 connecting the center lug grooves 14 adjacent to each other is provided, and thus a contact pressure is released by dividing the center block portions 12A into the small center block portions 12A'. As a result, heal-and-toe wear resistance performance can be improved, and traction performance on wet road surfaces can be improved due to the edge effect of the center circumferential narrow groove 15. The groove depth $D_1$ of the center circumferential narrow groove 15 is set to fall within a predetermined range with respect to the maximum groove depth D in the tread surface 3. Thus, traction performance on wet road surfaces can be improved without causing degradation in block rigidity. It is assumed that the groove depth $D_1$ is the maximum groove depth.

Further, in the pneumatic tire 1 according to the present embodiment, the center lug grooves 14 are preferably disposed obliquely with respect to the tire circumferential direction, and the center block portions 12A are preferably disposed obliquely with respect to the tire circumferential direction and the tire lateral direction. In the pneumatic tire 1, the small center block portions 12A' defined by the center lug grooves 14 and the center circumferential narrow grooves 15 are disposed in a staggered shape in the tire circumferential direction and the tire lateral direction, and thus an edge effect can be obtained while suppressing degradation in block rigidity of the entire center block portions 12A. Thus, traction performance on wet road surfaces can be improved.

Further, in the pneumatic tire 1 according to the present embodiment, the center circumferential narrow groove 15 is preferably provided to be inclined with respect to the tire circumferential direction (tire equator line CL), and the center circumferential narrow groove 15 preferably has an angle $\theta_3$ (see FIG. 3) with respect to the tire circumferential direction, which satisfies $5°\leq\theta_3\leq25°$. According to the pneumatic tire 1, an edge effect can be exerted while suppressing degradation in block rigidity, and thus heal-and-toe wear resistance performance and traction performance on wet road surfaces can be achieved in a well-balanced manner.

Further, in the pneumatic tire 1 according to the present embodiment, the center block portion 12A preferably has the acute corner portion 12Aa at the part communicating with the center lug groove 14 and the innermost circumferential main groove 11, and the acute corner portion 12Aa preferably has the chamfer 12Ab inclined inward in the tire radial direction from the tread surface 3. In the pneumatic tire 1, when the acute corner portion 12Aa is provided in the center block portions 12A, an edge effect can be improved, and traction performance on wet road surfaces can be improved. Moreover, the chamfer 12Ab is formed at the acute corner portion 12Aa, and thus a contact pressure in the acute corner portion 12Aa is released. Thus, heal-and-toe wear resistance performance can be improved.

Further, in the pneumatic tire 1 according to the present embodiment, in order to improve an edge effect and release a contact pressure in the acute corner portion 12Aa, the acute corner portion 12Aa preferably has an angle $\theta_6$ (see FIG. 3) satisfying $35°\leq\theta_6\leq65°$.

Further, in the pneumatic tire 1 according to the present embodiment, the center lug groove 14 preferably includes: the center groove portion 14B that transects the tire equator line CL; and the end groove portions 14A that are continuous outward of the center groove portion 14B in the tire lateral direction and that open to the innermost circumferential main grooves 11, and the maximum groove depth D in the tread surface 3, the groove depth $D_2$ of the center groove portion 14B, and the groove depth $D_3$ of the end groove portions 14A preferably satisfy relationship of $D_2 > D_3$, $0.65 \leq D_2/D \leq 0.90$, and $0.40 \leq D_3/D \leq 0.65$. In the pneumatic tire 1, the groove depth of the center groove portion 14B being the center portion of the center lug groove 14 is increased, and the groove depth of the end groove portions 14A being the end portions is reduced. With this, heal-and-toe wear resistance performance can be secured while maintaining the block rigidity of the center block portion 12A, and at the same time, traction performance on wet road surfaces can be secured after a wear intermediate stage. It is assumed that the groove depth $D_2$ is the maximum groove depth and that the groove depth $D_3$ is the minimum groove depth.

Further, in the pneumatic tire 1 according to the present embodiment, the groove width $W_1$ of the shoulder lug groove 17 and the groove width $W_2$ of the center lug groove 14 satisfy a relationship of $0.20 \leq W_2/W_1 \leq 0.40$. In the pneumatic tire 1, the relationship between the groove width $W_1$ of the shoulder lug groove 17 and the groove width $W_2$ of the center lug groove 14 is defined. With this, as the pattern of the tread surface 3, the effect of improving heal-and-toe wear resistance performance, which is exerted by suppressing degradation in block rigidity and the effect of improving traction performance on wet road surfaces due to an edge effect can be achieved in a well-balanced manner. It is assumed that the groove width $W_1$ and the groove width $W_2$ are the maximum groove widths.

Further, in the pneumatic tire 1 according to the present embodiment, the innermost circumferential main grooves 11 are preferably disposed to be offset in the tire lateral direction at the parts communicating with the center lug grooves 14, and the groove width $W_3$ and an offset width $W_4$ (see FIG. 3) of the innermost circumferential main grooves 11 preferably satisfy a relationship of $0.55 \leq W_3/W_4 \leq 0.85$. In the pneumatic tire 1, with the offset of the innermost circumferential main grooves 11, heal-and-toe wear resistance performance can be improved by suppressing degradation in the block rigidity of the center block portion 12A, and at the same time, traction performance on wet road surfaces can be improved due to an edge effect. It is assumed that the groove width $W_3$ is the maximum groove width and that the offset width $W_4$ is the shortest distance between the center lines of the innermost circumferential main grooves 11.

Further, in the pneumatic tire 1 according to the present embodiment, the groove width $W_3$ of the innermost circumferential main groove 11 and the tread developed width TDW preferably satisfy a relationship of $0.01 \leq W_3/TDW \leq 0.07$. According to the pneumatic tire 1, when $0.01 \leq W_3/TDW$ is satisfied, the groove width $W_3$ of the innermost circumferential main groove 11 is secured. Thus, drainage performance can be secured, and traction performance on wet road surfaces can be improved. Meanwhile, when $W_3/TDW \leq 0.07$ is satisfied, the size reduction of the center block portion 12A is suppressed. Thus, block rigidity can be secured, and heal-and-toe wear resistance performance can be improved. It is assumed that the groove width $W_3$ is the maximum groove width.

Further, in the pneumatic tire 1 according to the present embodiment, the shoulder block portion 13A preferably extends in the tire circumferential direction in a shape that allows the shoulder lug grooves 17 adjacent to each other in the tire circumferential direction to communicate with each other and includes the shoulder circumferential narrow groove 18 including the bent portion 18A in the midway, and the groove depth $D_4$ of the shoulder circumferential narrow groove 18 and the maximum groove depth D in the tread surface 3 preferably satisfy a relationship of $0.60 \leq D_4/D \leq 0.90$. According to the pneumatic tire 1, the shoulder block portion 13A is provided with the shoulder circumferential narrow groove 18, and thus the shoulder block portion 13A is divided into the small shoulder block portions 13A'.

With this, a contact pressure in the shoulder block portion 13A can be released, and heal-and-toe wear resistance performance can be improved. Additionally, the shoulder circumferential narrow groove 18 includes the bent portion 18A in the midway, and thus the groove length is secured to increase an edge effect in the tire circumferential direction. Thus, traction performance on wet road surfaces can be improved. Note that, in order to release a contact pressure in the shoulder block portion 13A, a relationship of $0.80 \leq D_4/D \leq 0.90$ is preferably satisfied. It is assumed that the groove depth $D_4$ is the maximum groove depth.

Further, in the pneumatic tire 1 according to the present embodiment, the shoulder circumferential narrow groove 18 preferably includes the narrow groove raised bottom portion 18B on the groove bottom at the part communicating with each of the shoulder lug grooves 17, and the groove depth $D_5$ of the narrow groove raised bottom portion 18B and the maximum groove depth D in the tread surface 3 preferably satisfy a relationship of $0.20 \leq D_5/D \leq 0.50$. According to the pneumatic tire 1, the shoulder circumferential narrow groove 18 preferably includes the narrow groove raised bottom portion 18B on the groove bottom at the part communicating with each of the shoulder lug grooves 17, and the small shoulder block portion 13A' are joined. With this, degradation in block rigidity can be suppressed, and heal-and-toe wear resistance performance can be improved. It is assumed that the groove depth $D_5$ is the minimum groove depth.

Further, in the pneumatic tire 1 according to the present embodiment, the shoulder circumferential narrow groove 18 preferably has the groove width $W_9$ satisfying $1 \text{ mm} \leq W_9 \leq 5 \text{ mm}$. According to the pneumatic tire 1, the groove width $W_9$ of the shoulder circumferential narrow groove 18 is defined, and hence the small shoulder block portions 13A' are mutually supported at the time of contact with the ground to secure block rigidity. Thus, heal-and-toe wear resistance performance can be improved.

Further, in the pneumatic tire 1 according to the present embodiment, the shoulder lug groove 17 preferably includes the lug groove raised bottom portion 17B on the groove bottom, and the groove depth $D_6$ of the lug groove raised bottom portion 17B and the maximum groove depth D in the tread surface 3 preferably satisfy a relationship of $0.50 \leq D_6/D \leq 0.90$. According to the pneumatic tire 1, with the lug groove raised bottom portion 17B, the block rigidity of the shoulder block portion 13A can be secured, and heal-and-toe wear resistance performance can be improved. Note that, in order to secure more block rigidity, a relationship of $0.80 \leq D_6/D \leq 0.90$ is preferably satisfied. It is assumed that the groove depth $D_6$ is the minimum groove depth.

Further, in the pneumatic tire 1 according to the present embodiment, the groove width $W_1$ of the shoulder lug groove 17 and the tread developed width TDW preferably satisfy a relationship of $0.03 \leq W_1/\text{TDW} \leq 0.20$. According to the pneumatic tire 1, when $0.03 \leq W_1/\text{TDW}$ is satisfied, the shoulder lug grooves 17 are prevented from being closed at the time of contact with the ground. Thus, drainage performance can be secured, and traction performance on wet road surfaces can be improved. Meanwhile, when $W_1/\text{TDW} \leq 0.20$ is satisfied, the size reduction of the shoulder block portion 13A is suppressed. Thus, block rigidity can be secured, and heal-and-toe wear resistance performance can be improved. It is assumed that the groove width $W_1$ is the maximum groove width.

Examples

In the examples, performance tests for heal-and-toe wear resistance performance and traction performance on wet road surfaces were performed on a plurality of types of pneumatic tires of different conditions (see FIGS. 5A-6C).

In the performance tests, a pneumatic tire (heavy duty pneumatic tire) having a tire size of 11R 22.5 was mounted to a specified rim, inflated to a specified air pressure, and mounted to a drive shaft of a test vehicle (2-DD, a tractor head).

Evaluation on heal-and-toe wear resistance performance was performed by measuring a heal-and-toe wear amount of block portions of a land portion after the test vehicle traveled on dry asphalt road surfaces for 50000 km. Further, based on the measurement results, index evaluation was carried out with Conventional Example being defined as the reference (100). In this index evaluation, larger values indicate a less heal-and-toe wear amount and superior heal-and-toe wear resistance performance.

Evaluation on traction performance on wet road surfaces was performed by measuring acceleration from a speed of 5 km/h to a speed of 20 km/h while the test vehicle traveled on asphalt road surfaces on which water was spread at a water depth of 1 mm. Further, based on the measurement results, index evaluation was carried out with Conventional Example being defined as the reference (100). Larger index values indicate higher acceleration and superior traction performance on wet road surfaces.

In Conventional Example, two circumferential main grooves were disposed in an inner half of a tread developed width in the tire lateral direction. Center lug grooves were not provided in a center land portion formed by the circumferential main grooves, and center sipes were not provided either. In Comparative Example 1, two circumferential main grooves were disposed in an inner half of a tread developed width in the tire lateral direction, a center land portion formed by the circumferential main grooves was divided by center lug grooves into center block portions, and a center sipe including one bent portion and two sipe portions was provided. However, an angle of the sipe portions did not fall within the specified range. In Comparative Example 2, two circumferential main grooves were disposed in an inner half of a tread developed width in the tire lateral direction, a center land portion formed by the circumferential main grooves was divided by center lug grooves into center block portions, and a center sipe was provided. However, the center sipe had a linear shape without a bent portion and had an angle that did not fall within the specified range. In contrast, in each of Examples, two circumferential main grooves were disposed in an inner half of a tread developed width in the tire lateral direction, a center land portion formed by the circumferential main grooves was divided by center lug grooves into center block portions. Further, a center sipe including one bent portion and two sipe portions was provided, and an angle of the sipe portions fell within the specified range.

As shown in the test results in FIGS. 5A-6C, it can be understood that the pneumatic tire in each Example improved heal-and-toe wear resistance performance and traction performance on wet road surfaces.

The invention claimed is:
1. A pneumatic tire, comprising:
at least two circumferential main grooves being provided and extending continuously along a tire circumferential direction in a tread surface, all of the circumferential main grooves being disposed in an inner half of a tread developed width in a tire lateral direction;
shoulder land portions being formed outward of outermost circumferential main grooves in the tire lateral direction, the outermost circumferential main grooves being on outermost sides in the tire lateral direction;

a plurality of shoulder lug grooves being provided to communicate with the outermost circumferential main grooves from outer edges of the tread surface in the tire lateral direction, being provided side by side in the tire circumferential direction, dividing the shoulder land portions into shoulder block portions, and each including a see-through portion in the tire lateral direction;

a center land portion being defined by a pair of innermost circumferential main grooves on an innermost side in the tire lateral direction, the pair of innermost circumferential main grooves being adjacent to each other across a tire equator line;

a plurality of center lug grooves being provided in the center land portion to communicate with each of the pair of innermost circumferential main grooves in the tire lateral direction, being provided side by side in the tire circumferential direction, and dividing the center land portion into a plurality of center block portions; and center sipes having both ends terminated in the plurality of center block portions, wherein the center sipes each includes at least two sipe portions having different angles via at least one bent portion, an angle $\theta_1$ of at least one of the sipe portions with respect to the tire equator line satisfies $0° \leq \theta_1 \leq 15°$, an angle $\theta_2$ of at least an other one of the sipe portions with respect to the tire equator line satisfies $35° \leq \theta_2 \leq 60°$, the center lug grooves include
a center groove portion that transects the tire equator line, and
end groove portions that are continuous outward of the center groove portion in the tire lateral direction and that open to the innermost circumferential main grooves, and a maximum groove depth D in the tread surface, a groove depth $D_2$ of the center groove portion, and a groove depth $D_3$ of the end groove portions at an opening of the center lug grooves to one of innermost circumferential main grooves satisfy relationships of $D_2 > D_3$, $0.65 \leq D_2/D \leq 0.90$, and $0.40 \leq D_3/D \leq 0.65$.

2. The pneumatic tire according to claim 1, wherein the center land portion includes a center circumferential narrow groove having both ends opening to the center lug grooves adjacent to each other in the tire circumferential direction, and a maximum groove depth D in the tread surface and a groove depth $D_1$ of the center circumferential narrow groove satisfy a relationship of $0.40 \leq D_1/D \leq 0.70$.

3. The pneumatic tire according to claim 2, wherein the center block portions have an acute corner portion at a part communicating with the center lug grooves and the one of the innermost circumferential main grooves, and the acute corner portion has a chamfer inclined inward in a tire radial direction from the tread surface.

4. The pneumatic tire according to claim 3, wherein a groove width $W_1$ of the shoulder lug grooves and a groove width $W_2$ of the center lug grooves satisfy a relationship of $0.20 \leq W_2/W_1 \leq 0.40$.

5. The pneumatic tire according to claim 4, wherein the innermost circumferential main grooves are disposed to be offset in the tire lateral direction at parts communicating with the center lug grooves, and a groove width $W_3$ and an offset width $W_4$ of the innermost circumferential main grooves satisfy a relationship of $0.55 \leq W_3/W_4 \leq 0.85$.

6. The pneumatic tire according to claim 5, wherein a groove width $W_3$ of the innermost circumferential main grooves and a tread developed width TDW satisfy a relationship of $0.01 \leq W_3/TDW \leq 0.07$.

7. The pneumatic tire according to claim 6, wherein the shoulder block portions extend in the tire circumferential direction in a shape that allows the shoulder lug grooves adjacent to each other in the tire circumferential direction to communicate with each other, and includes a shoulder circumferential narrow groove including a bent portion in a midway, and a groove depth $D_4$ of the shoulder circumferential narrow groove and a maximum groove depth D in the tread surface satisfy a relationship of $0.60 \leq D_4/D \leq 0.90$.

8. The pneumatic tire according to claim 7, wherein the shoulder block portions extend in the tire circumferential direction in a shape that allows the shoulder lug grooves adjacent to each other in the tire circumferential direction to communicate with each other and includes a shoulder circumferential narrow groove including a bent portion in a midway, the shoulder circumferential narrow groove includes a narrow groove raised bottom portion on a groove bottom at a part communicating with each of the shoulder lug grooves, and a groove depth $D_5$ of the narrow groove raised bottom portion and a maximum groove depth D in the tread surface satisfy a relationship of $0.20 \leq D_5/D \leq 0.50$.

9. The pneumatic tire according to claim 8, wherein the shoulder lug grooves include a lug groove raised bottom portion on a groove bottom, and a groove depth $D_6$ of the lug groove raised bottom portion and a maximum groove depth D in the tread surface satisfy a relationship of $0.50 \leq D_6/D \leq 0.90$.

10. The pneumatic tire according to claim 1, wherein the center block portions have an acute corner portion at a part communicating with the center lug grooves and the one of the innermost circumferential main grooves, and the acute corner portion has a chamfer inclined inward in a tire radial direction from the tread surface.

11. The pneumatic tire according to claim 1, wherein a groove width $W_1$ of the shoulder lug grooves and a groove width $W_2$ of the center lug grooves satisfy a relationship of $0.20 \leq W_2/W_1 \leq 0.40$.

12. The pneumatic tire according to claim 1, wherein the innermost circumferential main grooves are disposed to be offset in the tire lateral direction at parts communicating with the center lug grooves, and a groove width $W_3$ and an offset width $W_4$ of the innermost circumferential main grooves satisfy a relationship of $0.55 \leq W_3/W_4 \leq 0.85$.

13. The pneumatic tire according to claim 1, wherein a groove width $W_3$ of the innermost circumferential main grooves and a tread developed width TDW satisfy a relationship of $0.01 \leq W_3/TDW \leq 0.07$.

14. The pneumatic tire according to claim 1, wherein the shoulder block portions extend in the tire circumferential direction in a shape that allows the shoulder lug grooves adjacent to each other in the tire circumferential direction to communicate with each other, and includes a shoulder circumferential narrow groove including a bent portion in a midway, and a groove depth $D_4$ of the shoulder circumferential narrow groove and a maximum groove depth D in the tread surface satisfy a relationship of $0.60 \leq D_4/D \leq 0.90$.

15. The pneumatic tire according to claim 1, wherein the shoulder block portions extend in the tire circumferential direction in a shape that allows the shoulder lug grooves adjacent to each other in the tire circumferential direction to communicate with each other and includes a shoulder circumferential narrow groove including a bent portion in a midway, the shoulder circumferential narrow groove includes a narrow groove raised bottom portion on a groove bottom at a part communicating with each of the shoulder lug grooves, and a groove depth $D_5$ of the narrow groove raised bottom portion and a maximum groove depth D in the tread surface satisfy a relationship of $0.20 \leq D_5/D \leq 0.50$.

16. The pneumatic tire according to claim 1, wherein the shoulder lug grooves include a lug groove raised bottom portion on a groove bottom, and a groove depth $D_6$ of the lug groove raised bottom portion and a maximum groove depth D in the tread surface satisfy a relationship of $0.50 \leq D_6/D \leq 0.90$.

* * * * *